United States Patent
Mazzella et al.

(10) Patent No.: US 7,118,622 B2
(45) Date of Patent: Oct. 10, 2006

(54) ORGANIC DYES SUITABLE FOR USE IN DRUGS AND COSMETICS LAKED ONTO A PLATY TITANIUM DIOXIDE PIGMENT

(75) Inventors: Frank A. Mazzella, Rhinebeck, NY (US); Gabriel E. Uzunian, Rye, NY (US)

(73) Assignee: Engelhard Corporation, Iselin, NJ (US)

( * ) Notice: Subject to any disclaimer, the term of this patent is extended or adjusted under 35 U.S.C. 154(b) by 0 days.

(21) Appl. No.: 11/126,928

(22) Filed: May 11, 2005

(65) Prior Publication Data

US 2005/0257716 A1     Nov. 24, 2005

Related U.S. Application Data

(60) Provisional application No. 60/644,918, filed on Jan. 19, 2005, provisional application No. 60/572,334, filed on May 19, 2004.

(51) Int. Cl.
  *C09B 63/00*  (2006.01)
  *C09B 57/00*  (2006.01)
  *A23L 1/275*  (2006.01)

(52) U.S. Cl. .............................. 106/402; 8/626; 8/636; 106/442; 106/447; 106/482; 106/489; 426/250

(58) Field of Classification Search .............. 106/402, 106/442, 447, 482, 489; 8/626, 636; 426/250
See application file for complete search history.

(56) References Cited

U.S. PATENT DOCUMENTS

| | | | |
|---|---|---|---|
| 3,087,827 A | 4/1963 | Klenke, Jr. et al. | 106/291 |
| 3,087,828 A | 4/1963 | Linton | 106/291 |
| 3,087,829 A | 4/1963 | Linton | 106/291 |
| 3,418,146 A | 12/1968 | Rieger et al. | 106/300 |
| 3,437,515 A | 4/1969 | Quinn | 117/100 |
| 3,861,946 A | 1/1975 | Waitkins et al. | 117/100 |
| 4,038,099 A | 7/1977 | DeLuca, Jr. et al. | 106/291 |
| 4,040,859 A | 8/1977 | Esselborn et al. | 106/291 |
| 4,084,983 A | 4/1978 | Bernhard et al. | 106/289 |
| 4,192,691 A | 3/1980 | Arminini | 106/291 |
| 4,883,539 A | 11/1989 | Mattila et al. | 106/417 |
| 4,968,351 A | 11/1990 | Ahmed et al. | 106/402 |
| 5,076,849 A | 12/1991 | Vapaaoksa et al. | 106/481 |
| 5,505,965 A * | 4/1996 | Lambridis et al. | 424/490 |
| 5,611,851 A | 3/1997 | DeLuca et al. | 106/415 |
| 5,858,078 A * | 1/1999 | Andes et al. | 106/437 |

FOREIGN PATENT DOCUMENTS

| | | |
|---|---|---|
| EP | 0 367 236 | 5/1990 |
| EP | 0 779 340 | 6/1997 |

* cited by examiner

*Primary Examiner*—Anthony J. Green
(74) *Attorney, Agent, or Firm*—Melanie L. Brown

(57) ABSTRACT

An unsupported platy titanium dioxide pigment containing an organic dye laked thereon. The dyed $TiO_2$ pigment is useful to color cosmetic, food, and drug formulations.

18 Claims, No Drawings

ORGANIC DYES SUITABLE FOR USE IN DRUGS AND COSMETICS LAKED ONTO A PLATY TITANIUM DIOXIDE PIGMENT

This application claims priority to Provisional Applications U.S. 60/572,334, filed May 19, 2004 and U.S. 60/644,918 filed Jan. 19, 2005.

FIELD OF THE INVENTION

This invention is directed to platy titanium dioxide pigments containing organic dyes suitable for use in drugs or cosmetics.

BACKGROUND OF THE INVENTION

Colored lustrous pigments are known in which the lustrous pigment part is a natural pearlescent material or synthetic pearlescent substance (also called nacreous pigments) and the colors are a wide variety of inorganic and organic coloring agents or dyestuffs. The processes used to make colored lustrous pigments in the prior art encountered numerous difficulties among which the following are noteworthy: severe bleeding of the color on filtration of the coated product from suspension; poor adherence of dyestuffs on the surface of the pigment such that the color could be washed off with water; difficulty of retaining luster with increased color intensity; and non-uniform distribution of the dyestuff on the pigment surface.

The foregoing problems are in part described in U.S. Pat. No. 4,084,983. This patent relates to the use of titanium dioxide-coated-mica pigments to produce colors due to interference phenomenon and additional color effects achieved by coating organic dyes on the surface of these pigments. In an attempt to overcome the problems encountered in the art, the dyestuff is chemically bound on the surface of the pigment with the help of a laking reagent. For example, one laking reagent disclosed is aluminum chloride which on hydrolysis produces layers of aluminum hydroxide with which the dye reacts to form the insoluble color lake thereby permitting the dye to deposit on the surface of the pigment. Although this approach particularly addresses the problem of poor adherence of the organic dye on the surface of the pigment, the problem of heavy bleeding of the uncoated dye remains severe. The failure of the previous art to control this problem has been a serious obstacle to developing a suitable process of preparing colored lustrous pigments of superior quality. This failure was the consequence of the inefficiency of the laking process, which resulted from the manner in which the laking was carried out and from the conditions maintained in the coating of the dye on the surface of the pigment.

U.S. Pat. No. 4,968,351 discloses a superior adsorbed dye colored nacreous pigment and method of producing same by contacting an aqueous dispersion of metal oxide coated substrate nacreous pigment with a solubilized dye and a laking reagent. The process of U.S. Pat. No. 4,968,351 is similar to that of the aforementioned U.S. Pat. No. 4,084,983 in that some of the same reagents can be used to produce the same general type of product. However, the manner in which these reagents are used, the conditions maintained during the laking process, and the quality of reagents employed are significantly different, leading to significantly different results. U.S. Pat. No. 4,084,983 employs a two-step process in which aluminum hydroxide, for example, is first deposited on the platy surface of the pigment and thereafter the aluminum hydroxide coated pigment, with or without isolation from the suspension in which it is formed and re-suspension, is reacted with a dye to form the insoluble color lake. This process depends on how well the dye binds to previously precipitated aluminum hydroxide on the pigment surface. Actually, the binding of the dye to form the color lake, by this method, becomes inefficient because of the loss of active sites as a result of the firmly adhering aluminum hydroxide layers already bound on the surface of the pigment. Fortunately, by following the reverse procedure it is possible to improve not only the efficiency of the laking process but also the quality of the product. In U.S. Pat. No. 4,968,351, an aqueous solution of the dye is combined with the nacreous pigment suspension and it has been found that when the pigment particles are allowed to settle out of suspension, they carry the dye molecules with them by physical adsorption such that much of the dye originally in solution is weakly adsorbed to the pigment particles. At this point in time the dye could be easily washed off the pigment surface with water. The laking reagent (e.g. a hydrolyzable aluminum compound) is added and the aluminum hydroxide precipitated on hydrolysis reacts with the already adsorbed dye to form a firmly adhering color lake on the surface of the pigment.

One the most important synthetic nacreous pigments is titanium dioxide-coated mica which is composed of a mica platelet having an adherent crystalline titanium dioxide coating thereon. The color exhibited is a function of the thickness of the coating. The composite pigment has good reflectivity characteristics, high stability to heat and chemical agents and is non-toxic, which makes it suitable for cosmetic application. The titanium dioxide may be in the anatase form as described, e.g., in U.S. Pat. Nos. 3,087,827; 3,087,828; 3,418,146; and, 3,437,515, or in the rutile crystalline form as described in U.S. Pat. No. 4,038,099.

Metal oxides other than titanium dioxide have been used to prepare similar types of nacreous pigments by coating on the mica platelets. Some examples include ferric oxide (U.S. Pat. No. 3,087,829), zirconium dioxide (U.S. Pat. No. 3,087,828), tin dioxide (U.S. Pat. No. 4,040,859) and the like.

The metal oxide coating on the mica substrate has a high refractive index and provides the optical effects, including high luster or reflectivity, coverage, interference reflection color (if the metal oxide coating is sufficiently thick) and absorption color (if the metal oxide contains color material). The mica, on the other hand, has a low refractive index and functions as a carrier or substrate, as well as contributing to some extent to the optical effect of the pigment. Importantly, titanium dioxide is an approved color additive for foods, drugs, and cosmetics. Mica is not approved for food and drugs.

Unsupported crystalline titanium dioxide platelet nacreous pigments are described in U.S. Pat. No. 3,861,946. The unsupported pigment is realized by coating the titanium dioxide on calcium sulfate chips and platelets followed by dissolving away the calcium sulfate substrate.

U.S. Pat. No. 4,192,691 describes the preparation of unsupported metal oxide nacreous pigments by treating a metal oxide-coated mica nacreous pigment with an aqueous acid solution containing hydrofluoric acid and mineral acid until the desired amount of mica has been extracted. The resulting pigment can be used in a wide variety of cosmetic and plastic applications and possesses improved stability, luster, mechanical integrity and other properties.

A number of the patents describe the removal of the substrate from metal oxide-coated substrates and particularly the dark mica varieties such as phlogopite and biotite. U.S. Pat. No. 4,883,539 describes a process in which a metal oxide-coated phlogopite mica pigment is treated with a mineral acid such as sulfuric acid, hydrochloric acid or nitric acid, preferably combined with some oxidizer such as nitric acid or hydrogen peroxide. U.S. Pat. No. 5,076,849 discloses conducting a two-step process in which the acidic extraction is followed by extracting the acid treated pigment with a base. This procedure is preferably applied to dark mica sorts such as phlogopite or biotite which have lower aluminum content and are therefore easier to dissolve rather than light mica sorts such as muscovite which do not favor a selective extraction of cations.

Unsupported metal oxide nacreous pigments and method of making same are further disclosed in U.S. Pat. No. 5,611,851. Such pigments are prepared by subjecting the metal oxide-coated mica nacreous pigment to an extractive dissolution in acid followed by an extractive dissolution in alkali. The metal oxide-coated mica nacreous pigments can be any of those known heretofore such as those prepared by the methods described in any of the foregoing references. Any of the crystalline forms of the mica substrate can be used although the invention has particular applicability to the muscovite form of mica.

SUMMARY OF THE INVENTION

Organic dyes which would be suitable for use in drugs and cosmetics are laked onto an unsupported platy titanium dioxide pigment. The platy $TiO_2$ pigment itself exhibits color, and the resulting colors fill new color space for use in drugs and cosmetics.

DETAILED DESCRIPTION OF THE INVENTION

In this invention, organic dyes which are acceptable for use in foods, drugs, and/or cosmetics are laked onto platy titanium dioxide pigments. The platy titanium dioxide pigments are unsupported and formed by coating a platy substrate such as mica with titanium dioxide and then removing the platy substrate such as by the processes disclosed in the patents discussed above. Preferably, the unsupported platy titanium dioxide pigments of the invention which form the support for the organic dyes are prepared by subjecting a titanium dioxide-coated mica nacreous pigment to an extractive dissolution in acid followed by an extractive dissolution in alkali as disclosed in aforementioned U.S. Pat. No. 5,611,851, the entire contents of which are herein incorporated by reference. The titanium dioxide-coated mica pigments can be any of those known heretofore such as those prepared by methods described in any of the foregoing references. Any of the crystalline forms of the mica substrate can be used, although the muscovite form of mica is particularly useful. Upon dissolution of the mica substrate, what results is a platy titanium dioxide pigment which comprises platy $TiO_2$ coatings separated by a thin film of air formed from the dissolution of the mica substrate. Thus, the platy $TiO_2$ pigments are unique in that such pigments bring into play the interaction of the reflection color and absorption color, creating a two-color effect. Further, the process of laking the dye or pigment onto the platy $TiO_2$ adds to the optical thickness of the platy $TiO_2$. Importantly, since titanium dioxide is an approved color additive to food, drugs, and cosmetics, the addition of FD&C and D&C organic dyes increases the potential number of colors currently used in foods, drugs, and cosmetics.

The unsupported $TiO_2$ platy pigment is formed by first applying an encapsulating $TiO_2$ coating on a platy mica substrate, as is well known in the art, and subsequently removing the mica substrate by acid extraction. The acid extractant used in the preferred method of the present invention is a combination of phosphoric acid and one or more mineral acids such as sulfuric acid, hydrochloric acid and nitric acid. In general, the acid solution can contain up to about 20% of the phosphoric acid, for instance about 1%–20%, preferably about 10%–15%, and up to about 35% of the mineral acid, for instance 5–35% and preferably about 25%–30%. The ratio of mineral acid to phosphoric acid can vary over a wide range of from 10:1 to 1:10 but preferably the mineral acid is present in excess such that the ratio is greater than about 1:1 up to about 3:1. The extractive dissolution is continued until the desired degree of aluminum and potassium components of the mica have been removed which can take as short a period of time as ¼ of an hour to as long as 20 hours or more, preferably about 4 to 8 hours. The extractive dissolution can be carried out at any convenient temperature such as those from about 20° C. to 150° C. As a general rule, the higher the temperature, the faster the dissolution. Preferably, the extractive dissolution takes place at reflux.

Following the extractive dissolution with the acid solution, the resulting titanium dioxide nacreous pigment is subjected to an extractive dissolution with the strong alkali. Any strong base can be used for this step although it is preferred to use either potassium hydroxide or, most preferably, sodium hydroxide because of their availability. The concentration of the base is generally up to about 40%, for instance about 1%–40% by weight, preferably about 5%–20% and most preferably about 12.5–17.5% by weight and it is advantageous to use an aqueous solution. The temperature of the base extraction step is not critical and any convenient temperature, preferably between about 20° and 110° C., can be used. Preferably the acid treated titanium dioxide nacreous pigment is slurried with an aqueous solution of the base until the desired degree of substrate has been removed which, in general, can take between ¼ and 20 hours or more but is most preferably about ½ to 3 hours.

Following the second extractive dissolution step, and if desired after the first dissolution step, the resulting titanium dioxide nacreous pigment can be recovered in any convenient fashion such as by filtering the slurry hot or cold, washing the filtered pigment and thereafter drying it.

As a result of the improved luster and color intensity achieved in the present invention, less of the unsupported metal oxide nacreous pigment is necessary than the metal oxide mica nacreous pigment from which it is derived to achieve at least equivalent pigment qualities. The amount of mica which is dissolved can be adjusted as desired and as the total amount of mica which is dissolved is increased, the luster or reflectivity of the product increases. In most cases, most of the mica will be dissolved such that the resulting product contains about 20% or less of mica. Preferably the resulting product contains about 10% or less of mica. For uses in foods, drugs and cosmetics, the level of mica must be limited to meet governmental regulations regarding additives such as colorants. Accordingly, levels of mica of less than 1% are desired. A small residue of mica does not have deleterious effects on the optical properties of the pigment. It is most preferable, however, to dissolve all of the mica and realize a pigment composed entirely of titanium dioxide and having a further increased luster. If mica is present, the colored additive may not be approved for certain cosmetic, food, or drug coloring applications. For such applications, levels of TiO$_2$ must be at least 97 wt. % of the colorant. Minor amounts of alumina and silica upon dissolution of the mica may be present.

In order to produce color effects in the TiO$_2$ pigment in addition to any interference colors, a large variety of organic dyes are available. The dyes which can be employed are those organic dyes which are solubilizable in aqueous media, some of which are shown in the following table and others of similar structure can be employed. The application of the dye and laking reagent can be achieved by the processes disclosed in U.S. Pat. No. 4,084,983 and, preferably, as disclosed in U.S. Pat. No. 4,968,351, the entire contents of both U.S. patents being herein incorporated by reference.

In accordance with U.S. Pat. No. 4,968,351, an aqueous solution of the dye is combined with the platy titanium dioxide pigment suspension. It has been found that when the pigment particles are allowed to settle out of suspension, they carry the dye molecules with them by physical adsorption such that much of the dye originally in solution is weakly adsorbed to the pigment particles. At this point in time the dye could be easily washed off the pigment surface with water. The laking reagent (e.g. a hydrolyzable aluminum compound) is added and the aluminum hydroxide precipitated on hydrolysis reacts with the already adsorbed dye to form a firmly adhering color lake on the surface of the pigment.

It is one advantage of the preferred process that the physically adsorbed dye permits homogeneous precipitation because by its presence on the surface of the pigment it is able to direct its precipitation as the aluminum hydroxide is slowly formed at a controlled rate, and at the same time it is able to prevent the formation of agglomerates because the freshly generated aluminum hydroxide does not have a chance to diffuse and produce agglomerates, thus maintaining the homogeneity of the coating. An additional advantage of this approach is that the freshly generated aluminum hydroxide has many more "active sites" which can react with the dye than the predeposited aluminum hydroxide bound on the surface of the pigment as, for example, in the previous art. This makes the preferred process not only economical because of a substantial saving in the amount of AlCl$_3$.6H$_2$O used but also qualitatively superior because the less the amount of AlCl$_3$.6H$_2$O used, the better the luster of the final product.

A further advantage of the preferred process arises from the discovery that the use of a high concentration of the pigment in the suspension containing the dye helps to eliminate bleeding completely for most dyes used and almost completely (>99.%) for some other dyes with the use of the appropriate amount of the laking reagent and the appropriate pH. It should be noted that the amount of dye coated on the final pigment depends upon the amount of laking reagent added. In principal, a calculated or an experimentally determined amount of the laking reagent should be capable of preventing bleeding. In practice, however, the prevention of bleeding by addition of large amounts of, e.g., aluminum chloride, produces agglomeration and consequent loss of luster in the final product. It has been found that a judicious balance between high pigment concentration and the amount of laking reagent prevents bleeding completely or almost completely. The high pigment concentration is generally to 20–30%, there being no advantage in using a higher concentration because of the high viscosity of the suspension as a consequence of which stirring becomes inefficient. The optimum amount of laking reagent like aluminum chloride has been experimentally determined to be only about 8% of the total weight of the pigment and about four times the amount of the dye (the corresponding aluminum hydroxide formed is found to be only about 1.33 times the amount of the dye). Moreover, this procedure not only prevents bleeding completely but also gives a product with improved luster.

It is to be noted that all dyes used are intended for use in cosmetic makeup or drug formulations, and as such, these dyes are recognized as certifiable colors in the United States. As such, all are designated in the most recent nomenclature as DC or FDC followed by the designated color and a number. The products of this invention are intended for use in drug and cosmetic makeup formulations, although these products need not be confined only to these applications. A non-limiting list of applicable dyes are as follows:

| Dye | Chemical Name |
| --- | --- |
| DC Red 6 (Lithol Rubin 13) | 4-(0-sulfo-p-tolylazo)-3-hydroxy-2-napthoic acid, disodium salt |
| DC Green 5 (Alizaria Cyanine Green F) | 2,2'-[9,10-dihydro-9,10-dioxo-1,4-anthracenediyl) dimino]bis[5-methyl benzenesulfonic acid] |
| FDC Yellow 5 (Tartrazine) | 5-Oxo-1-(p-sulfo phenyl)-4-[p-sulfo-phenyl)azo]-2-pyrazoline-3-carborylic acid, trisodium salt |
| FDC Yellow 6 (Sunset Yellow) | 1-p-sulfophenylazo-2-naphthol-6-sulfonic acid, disodium salt |
| FDC Blue 1 (Brilliant Blue FCF) | Ethyl[4-[p-[ethyl(m-sulfobenzyl)amino-.alpha.-(09-sulfoamino]-alpha-0-phenyl)benzylidene]-2,5-cyclohexadiene-1-ylidene]m-sulfobenzyl) ammonium hydroxide, disodium salt |
| DC Red 33 (Acid Fuchsine) | 8-amino-2-phenylazo-1-napthol-3,6-disulfonic acid, disodium salt |
| FDC Red 40 (Allura) | 6-hydroxy-5-[(2-methoxyl-5-methyl-4-sulfonphenyl)-azo]-2-naphthalene-sulfonic acid, disodium salt |
| FDC Red 4 (Ponceau SX) | 3-[(2,4-dimethyl-5-sulfonphenyl)-azo]-4-hydroxy-1-naphthalene-sulfonic acid, disodium salt |
| FDC Blue 2 (Indigotine) | 5,5'-disulfo-3,3'-dioxo-delta$^{2,2'}$-biindoline, disodium salt |
| FDC Green 3 (Fast Green FCF) | 4-[[4-(N-ethyl-m-sulfonbenzylamino)phenyl](4-hydroxy-2-sulfonium phenyl)methylene]-[1-(N-ethyl-N-m-sulfobenzyl)delta$^{2,5'}$-cyclohexadienimine], disodium salt |
| DC Green 8 (Pyranine Concentrated) | 8-hydroxy-1,3-6-pyrenetrisulfonic acid, trisodium |
| DC Orange 4 (Orange II) | 1-p-sulfophenyl azo-2-naphthol, monosodium salt |
| DC Red 8 | 1-(4-chloro-0-sulfo-5-tolylazo)-sulfo-2-naphthol, monosodium salt |
| DC Yellow 10 (Quizoline Yellow) | 2-(2-quinolyl)-1,3-indandione disulfonic acid, disodium salt |
| Ext DC Violet 2 (Alizarin Violet) | 2-[(9,10-dihydro-4-hydroxy-9,10-dioso-1-anthracenyl)amino]-5-methylbenzene sulfonic acid, monosodium salt |
| Ext DC Yellow 7 (Naphthol Yellow S) | 8-hydroxy-5,7-dinitro-2-naphthalenesulfonic acid, monosodium salt |
| DC Brown 1 (Resorcin Brown) | 4[[5-(dialkylphenyl)-azo]-2,4-dihydroxy phenyl]azo]-benzene-sulfonic acid, monosodium salt |

Additional dyes which can be used for food, drug, or cosmetic applications are disclosed in U.S. Pat. No. 4,084,983 and 21 CFR (Code of Federal Regulations), Part 74. Moreover, there are a number of dyes that are permissible for use as colorants in foods, drugs, and cosmetics in Europe, but not in the U.S. Such dyes are also applicable for use in the present invention.

In the process, an aqueous dispersion of the platy titanium dioxide pigment and dye is provided. The dispersion can be formed by adding the dye to an aqueous suspension of the platy titanium dioxide. In the preferred process, the platy titanium dioxide is dispersed in a solution of the dye itself and a known volume of distilled water to give an appropriate concentration of the pigment and the dye. Although it is not practical to use high concentrations like 40–50% of pigment, as noted before, it is found to be advantageous to use about 20–30% pigment concentrations. The pH of the dispersion is adjusted to the coating pH before the coating is initiated. Since the pH of the dispersion is normally higher than the coating pH, it can be brought down to the coating pH with the laking reagent itself when there will be in situ generation of acid. It should be noted that the importance of pH in the laking process was not completely recognized in the past because the fact was ignored that $AlCl_3.6H_2O$ on hydrolysis forms a large variety of oligomeric and polymeric species, the nature of which depends on the pH, which in turn affects the quality of the product. The best pH for the coating process using an aluminum laking reagent was found to be about 5.0. Any pH below or above about 5.0 gives less coating of the dye, hence bleeding, and lower luster in the final product. It is believed that at this optimum pH of 5.0 maximum formation of insoluble aluminum hydroxide sol with finely divided particles takes place which gives rise to the homogeneous precipitation of the dye, and which in turn produces better luster in the final product. However, the coating may be done in the pH range of 4.5–7.0 with some loss in the quality of the product above or below pH of 5.0.

Although the laking reagent most commonly used is aluminum chloride, other salts of aluminum such as aluminum sulfate or potassium aluminum sulfate can be used with the same effect. No appreciable difference in the quality of the product is observed with the difference in the nature of the anion. It has been found advantageous to use an aluminum laking reagent containing about 20–30% $AlCl_3.6H_2O$ whereby the higher concentration of the added reagent maintains a low volume of the dispersed aqueous system. Simultaneous addition of a base, preferably 5–10% sodium hydroxide, is required to maintain a constant pH throughout the coating, while the pigment suspension is continuously stirred.

In the present invention, the coating of the dye is preferably carried out at room temperature. It is found that there is no particular advantage in heating the pigment dispersion at higher temperatures like 40°–70° C. and particularly at high temperatures like 85°–90° C. as in U.S. Pat. No. 4,084,983. The heating is actually a disadvantage because as the temperature increases, so does the bleeding. At 85°–90° C., the bleeding is so heavy that an enormous amount of laking reagent is required to prevent it. Moreover, there is significant loss in luster with increase in temperature. Although the bleeding can be prevented by using a high concentration of laking reagent, it is obviously advantageous to use the lowest temperature and smallest amount of reagent which are able to prevent bleeding and at the same time maintain high luster. As an example, by employing the present method of coating at 25° C. it is possible to coat 99.8% of the added dye, whereas on repeating the previous art process under similar conditions but higher temperature of 90° C., only 35% of the added dye coated. The color intensity of the latter product was obviously quite low compared to the former. In U.S. Pat. No. 4,084,983, the assumption was made that a higher temperature-during the laking process had a good effect on the quality of the product. It has been found, however, that the best products are obtained in the room temperature region of about 25°–35° C. and higher temperatures actually have pronounced deleterious effect on the luster of the final product.

The pigment suspension with the coated dye is preferably stirred at a moderate speed after the addition of reagents to ensure completion of the coating process. The final product after filtration, washing and drying shows brilliant color intensity and high luster even with as low as about 1 to 2% dye coating on the basis of the pigment weight. Products with exceptionally bright colors, and surprisingly with no significant loss in luster, can be obtained by coating about 4–5% or more dye through this invention.

Colored lustrous pigments can be made by laking with metals other than aluminum, depending on the dye. Zirconium tetrachloride is able to precipitate all of the dyes of Table I. However, Ca, Ba and Sr chlorides are able to lake only the DC Red 6 in Table I. Sodium and potassium salts may also be useful and are approved for D&C colors.

The fact that divalent ions like $Ca^{+2}$, $Ba^{+2}$ and $Sr^{+2}$ are able to complex the red dye gives rise to an important part of the invention. The complexes are fortunately insoluble in aqueous systems and therefore do not give rise to bleeding problems. More importantly, the properties of the complexes depend upon the nature of the ion employed to form them. Thus the Ca, Ba and Sr lakes of the red dye in the present invention are colors of outstanding brilliance and smooth luster, clearly different from aluminum and zirconium lakes. The calcium lake deposited on the platy titanium dioxide pigment has a strong pink color (with 2% dye). The barium is more towards orange with an unusually soft texture of the powder and the strontium lake has a deep red color.

The coating process with zirconium tetrachloride as the laking reagent is basically the same as that employed for aluminum chloride except that the pH should be maintained at about 4.0 throughout the coating process. However, the coating may be done at pH in the range of about 3.0–4.5 without any deleterious effect.

The coating process using calcium, barium and strontium chlorides as the laking reagent is slightly modified with respect to the process with aluminum and zirconium chlorides. Whereas an excess of latter should be avoided because it causes agglomeration in the final product, the former can be added in excess (ca 2–3 times) with good results. On the addition of this excess of the divalent metal salts, the pH of the dispersion (which contains the pigment and the dye) goes down only slightly from 5.0 to 4.7 which can be adjusted back to 5.0 with a small quantity of base. Obviously, simultaneous addition of base is not necessary in the case of divalent metal ions as it is in the case of aluminum and zirconium chlorides which hydrolyze to produce an acid solution which in turn must be continuously neutralized with a base.

A further important aspect of the invention is that a similar laking procedure as used to make colored lustrous pigments can be utilized to make products with two-color effects by simply using different combinations of platy titanium dioxide pigments and organic dyes.

The products of the present invention are colored lustrous pigments of superior quality in that they possess strong color intensity, high luster and soft texture of the powder.

This invention produces a new series of lustrous pigments. They derive color from both light interference and light absorption. The combination of these two-color-producing mechanisms results in a unique double color. In each double color, the pigment particle consists of platy titanium dioxide which produces the reflection color, which is seen as a colored highlight. The added colored component, the organic dye, imparts its own unique second color by light absorption; this is the background color.

The procedure to make the products with two-color effects is essentially as that employed for the colored lustrous pigments as described before. Again a high concentration of pigment in the aqueous suspension is an advantage—30% can be used with good results. The coating pH, however, is varied from about 5–7.0 to produce a variety of color effects. The amount of dye deposited on the surface of the pigment is an important factor in producing desired products with proper color effects. The amount is usually about 0.5–6%, preferably about 1–5% of the pigment weight. A higher percentage has a tendency to mask the original reflection highlight color. Other products with desired color effect can be obtained by utilizing the present invention by those skilled in the art.

Thus, for example, the invention herein can be expanded to the laking of organic dyes onto various interference pigments that heretofore have not been considered for such process. Thus, while the prior art has been limited to laking organic dyes onto titanium dioxide- or zirconium oxide-coated mica, it is now possible to provide a wider inventory of colored lustrous pigments than has heretofore been known. Thus, in a broader aspect of the invention, organic dyes or pigments such as those suitable for foods, drugs, or cosmetics, as well as for use in inks, plastics, or other industrial uses, can be laked onto a substrate that is an interference pigment other than a metal oxide-coated mica. Thus, the interference pigments can be comprised of natural pigments other than mica or synthetic pigments coated with metal oxides. For example, the substrates can be kaolin, silica, borosilicate glass, alumina, aluminum silicate, synthetic mica such as fluorophlogopite or other suitable transparent or opaque laminar substrates. The metal oxides that can be coated upon these substrates include, but are not strictly limited to, the oxides of titanium, iron, chromium, aluminum, cobalt, cobalt-iron, zirconium, zinc, tin, copper, antimony, and/or manganese. Colorants, typically pigments formed from metal oxide platelets and the organic dyes, have previously been used with each other, but independently from each other. In the present invention, these separate colorants are now combined to form a new, single pigment that is easily incorporated into various vehicles, rather than separately mixing and grinding the two colorants with the vehicle.

The invention is illustrated but in no way limited by the following examples, in which all percentages are by weight unless otherwise stated.

EXAMPLE

In this example, FD&C Blue was laked onto a platy $TiO_2$ pigment.

A platy blue pigment was formed from a $TiO_2$-coated mica by the process disclosed in U.S. Pat. No. 5,611,851. After dissolution of the mica, a $TiO_2$ plate having a thickness of about 130 nm was provided. This platy pigment has a bluish hue.

5.0 grams of FD&C Blue #1 and 95 grams of platy blue as described above were added to a 3 liter Horton flask. 1 liter of tap water was added to the flask and the mixture stirred at 250 rpm. Subsequently, 150 grams of 10% $AlCl_3.6H_2O$ were added while maintaining the pH of the mixture at 5.5 using 10% NaOH. The treated pigment was filtered and washed three times with 1 liter of tap water for each washing. The washed pigment was dried at 95° C. and separated using a 325 mesh sieve.

What is claimed is:

1. An unsupported platy $TiO_2$ pigment having at least one laked organic dye contained thereon, said platy $TiO_2$ pigment containing a pair of adjacent $TiO_2$ plates having a film of air between said plates.

2. The pigment of claim 1 wherein said at least one organic dye is an FD&C or D&C color.

3. The pigment of claim 1 wherein said at least one organic dye is laked onto the unsupported platy $TiO_2$ by an aluminum-containing laking reagent.

4. The pigment of claim 1 wherein said at least one organic dye is laked onto the unsupported platy $TiO_2$ by an Na, K, Ca, Ba, or Sr containing laking reagent.

5. The pigment of claim 1 wherein said unsupported platy $TiO_2$ pigment contains greater than 97 wt. % $TiO_2$.

6. A cosmetic formulation containing the pigment of claim 2.

7. A drug formulation containing the pigment of claim 2.

8. A food containing the pigment of claim 2.

9. A pigment comprising a platy substrate of kaolin or a synthetic platy substrate having a metal oxide coating thereon, and an organic dye laked onto said metal oxide coating.

10. The pigment of claim 9 wherein said synthetic platy substrate comprises silica, glass, alumina, aluminum silicate, or fiurophlogopite.

11. A method of forming a dyed $TiO_2$ pigment comprising:
   (a) encapsulating a platy mica substrate with a coating of $TiO_2$,
   (b) extracting the mica substrate to form an unsupported platy $TiO_2$ pigment, said platy $TiO_2$ pigment containing a pair of adjacent $TiO_2$ plates having a film of air between said plates, and
   (c) laking at least one organic dye onto said $TiO_2$ pigment.

12. The method of claim 11 wherein said mica substrate is extracted with an acid.

13. The method of claim 12 wherein (b) said mica substrate is first extracted with an acid and subsequently with an alkali.

14. The method of claim 11 comprising (c) forming an aqueous dispersion of said titanium dioxide pigment and said at least one organic dye to absorb the dye onto said $TiO_2$ pigment and subsequently adding a laking reagent to said dyed $TiO_2$ pigment to fix said at least one organic dye on said pigment.

15. The method of claim 14 wherein said laking reagent comprises an aluminum salt.

16. The method of claim 14 wherein said laking reagent comprises a salt containing Na, K, Ca, Ba, or Sr.

17. The method of claim 11 wherein said at least one organic dye is an FD&C or D&C color.

18. The method of claim 14 wherein said aqueous dispersion contains 20–30 wt. % of said pigment.

* * * * *